US010049089B2

(12) United States Patent
Scoda et al.

(10) Patent No.: US 10,049,089 B2
(45) Date of Patent: Aug. 14, 2018

(54) METHODS FOR COMPRESSING WEB PAGE MENUS AND DEVICES THEREOF

(71) Applicant: Usablenet Inc., New York, NY (US)

(72) Inventors: Enrico Scoda, Martignacco (IT); Marco Brondani, Udine (IT)

(73) Assignee: UsableNet Inc., New York, NY (US)

( * ) Notice: Subject to any disclaimer, the term of this patent is extended or adjusted under 35 U.S.C. 154(b) by 360 days.

(21) Appl. No.: 13/801,821

(22) Filed: Mar. 13, 2013

(65) Prior Publication Data
US 2014/0281882 A1 Sep. 18, 2014

(51) Int. Cl.
G06F 17/22 (2006.01)
G06F 17/30 (2006.01)

(52) U.S. Cl.
CPC ...... G06F 17/2247 (2013.01); G06F 17/3089 (2013.01); G06F 17/30902 (2013.01)

(58) Field of Classification Search
CPC ............. G06F 17/2247; G06F 17/3089; G06F 17/30902
See application file for complete search history.

(56) References Cited

U.S. PATENT DOCUMENTS

| 5,850,214 | A | | 12/1998 | McNally et al. | |
|---|---|---|---|---|---|
| 5,870,559 | A | * | 2/1999 | Leshem ................ | G06F 11/32 707/E17.116 |
| 6,012,062 | A | * | 1/2000 | Jagadish ................ | G06T 9/005 |
| 6,384,850 | B1 | | 5/2002 | McNally et al. | |
| 6,392,568 | B1 | * | 5/2002 | Cooper ................ | H03M 7/3088 341/106 |
| 6,871,325 | B1 | | 3/2005 | McNally et al. | |
| 6,982,733 | B1 | | 1/2006 | McNally et al. | |
| 7,026,962 | B1 | * | 4/2006 | Emami et al. ................ | 341/51 |
| 7,431,650 | B2 | | 10/2008 | Kessman et al. | |

(Continued)

FOREIGN PATENT DOCUMENTS

| JP | H10133820 A | 5/1998 |
|---|---|---|
| WO | 2001022289 A1 | 3/2001 |

OTHER PUBLICATIONS

European Search Report for European Patent Application No. 14159441.6 (dated Jul. 7, 2014).

(Continued)

Primary Examiner — Stephen Hong
Assistant Examiner — Hope C Sheffield
(74) Attorney, Agent, or Firm — LeClairRyan PLLC

(57) ABSTRACT

A method, non-transitory computer readable medium, and apparatus that obtains an original menu associated with a web page requested by a client computing device. The original menu comprises at least a plurality of URLs, each comprising one or more fragments, and a plurality of titles, each comprising one or more words. A unique index for one occurrence of each of at least a subset of the fragments and the words is generated. At least one dictionary comprising the generated indices associated with a corresponding one of the fragments or the words is generated. A modified menu is generated by replacing each occurrence of each of the at least a subset of the one or more fragments and the one or more words of the original menu with a corresponding one of the unique indices. The modified menu and the at least one dictionary are sent to the client computing device.

24 Claims, 4 Drawing Sheets

(56) References Cited

U.S. PATENT DOCUMENTS

| | | |
|---|---|---|
| 7,809,697 B1* | 10/2010 | Kanefsky .......... G06F 17/30887 707/693 |
| 7,878,909 B2 | 2/2011 | Kessman et al. |
| 8,146,077 B2 | 3/2012 | McNally et al. |
| 8,383,969 B2 | 2/2013 | Mittu et al. |
| 9,005,031 B2 | 4/2015 | Kessman et al. |
| 9,009,060 B2 | 4/2015 | McNally |
| 9,072,965 B2 | 7/2015 | Kessman et al. |
| 9,390,590 B2 | 7/2016 | Kessman et al. |
| 2002/0059204 A1* | 5/2002 | Harris .................. 707/3 |
| 2002/0091684 A1* | 7/2002 | Nomiyama et al. .......... 707/3 |
| 2004/0024867 A1* | 2/2004 | Kjellberg ............ 709/224 |
| 2004/0044622 A1* | 3/2004 | Blott .............. G06Q 30/06 705/40 |
| 2005/0027731 A1* | 2/2005 | Revel .................. 707/101 |
| 2005/0204308 A1 | 9/2005 | McNally et al. |
| 2006/0020497 A1 | 1/2006 | McNally |
| 2006/0195510 A1 | 8/2006 | McNally |
| 2006/0230350 A1* | 10/2006 | Baluja ................ 715/700 |
| 2007/0265064 A1 | 11/2007 | Kessman et al. |
| 2009/0063465 A1* | 3/2009 | Ferragina et al. ............ 707/5 |
| 2009/0089278 A1* | 4/2009 | Poola .............. G06F 17/30864 |
| 2010/0095359 A1* | 4/2010 | Gordon ........................ 726/6 |
| 2010/0268720 A1* | 10/2010 | Spivack et al. ............. 707/756 |
| 2011/0105223 A1 | 5/2011 | Kessman et al. |
| 2011/0119268 A1* | 5/2011 | Rajaram et al. ............. 707/737 |
| 2011/0295990 A1* | 12/2011 | St. Jean et al. ............. 709/223 |
| 2013/0073536 A1* | 3/2013 | Fedorynski ....... G06F 17/30887 707/709 |
| 2013/0346483 A1* | 12/2013 | Alstad et al. ................ 709/203 |
| 2014/0221069 A1 | 8/2014 | Kessman et al. |
| 2014/0249937 A1 | 9/2014 | McNally |
| 2014/0279093 A1 | 9/2014 | McNally |
| 2015/0080081 A1 | 3/2015 | Kessman et al. |
| 2015/0287284 A1 | 10/2015 | Kessman et al. |
| 2016/0314651 A1 | 10/2016 | Kessman et al. |

OTHER PUBLICATIONS

Sandoz, Paul, et al., "The Fast Infoset", Retrieved from the Internet: URL:http://www.oracle.com/technetwork/articles/javases/fastinfoset-139262.html on Jun. 12, 2014 (Jun. 30, 2004).

European Office Action for EP Application No. 14159441.6 dated Feb. 2, 2017, pp. 1-10.

Lee, David A., "XML Encoding Techniques for Storing XML Data on Memory Limited (Mobile) Devices", XML2006 Conference, Dec. 31, 2006, XP055338343.

* cited by examiner

```
"Shoes",
[
    "Men Shoes",
    "http://www.acme.com/catalog/Men_Shoes/products?plp_i=2354&sort=price",
    "Women Shoes",
    "http://www.acme.com/catalog/Women_Shoes/products?plp_i=2358&sort=price"
],
"Accessories",
"http://www.acme.com/catalog/Accessories/products?plp_i=1348&sort=price",
"Dresses",
[
    "Long Dresses",
    "http://www.acme.com/catalog/Accessories/products?plp_i=4242&sort=price",
    "Ceremonies",
    "http://www.acme.com/catalog/Ceremonies/products?plp_i=7718&sort=price"
]
```

*FIG. 3*

```
{
    "longWords":3,
    "longParams":1,
    "ch":"_",
    "baseUrl":"http://www.acme.com/catalog/",
    "params":["02& 06&","plp_i","sort"],
    "wl":2,
    "words":["products"," 02/ 00","Accessories","Shoes","Men",
            "Women","price","Dresses","Long","Ceremonies"],
    "tree":[
        "03",
        [
            "0403",
            " 0403/ 00?01&2354&00",
            "0503",
            " 0503/ 00?01&2358&00"
        ],
        "02",
        " 02/ 00?01&1348&00",
        "07",
        [
            "0807",
            " 02/ 00?01&4242&00",
            "09",
            " 09/ 00?01&7718&00"
        ]
    ]
}
```

*FIG. 4*

METHODS FOR COMPRESSING WEB PAGE MENUS AND DEVICES THEREOF

FIELD

This technology generally relates to methods, non-transitory computer readable medium, and apparatuses for compressing source code defining web page menus and, more particularly, for reducing the amount of time required to send, and the amount of memory required to store, source code defining web page menus.

BACKGROUND

Many web sites, including particularly retail web sites, have a large number of web pages organized based of categories and subcategories of content. In order to present a user with information regarding the organization of the web site, these web pages often include a hierarchical menu. The hierarchical menu allows a user to browse the categories and subcategories without leaving the current web page.

While a hierarchical menu enhances the user experience, including a hierarchical menu increases the size of the web pages. The increased size is due to the information, including category and subcategory titles and hyperlink addresses, required to present the hierarchical menu. Due to the increased size, web pages with menus require an increased amount of time to retrieve from a server.

To reduce the time required to retrieve each web page, some web site hosts store the menu source code in an external file separate from the web pages. The external file is downloaded one time at a client device and is referenced by the web pages when the menu is rendered by a web browser of the client device. While the web pages might be retrieved relatively quickly, the initial download of this external file can require a significant amount of time. Additionally, this external file stored at the client device can require a significant amount of memory. In many client devices, particularly mobile devices, such as smart phones, memory is a limited resource and utilizing a significant amount of memory to store this external file defining a menu is not desirable.

SUMMARY

A method for compressing menus includes obtaining, with a menu management computing apparatus, an original menu associated with a web page requested by a client computing device. The original menu comprises at least a plurality of uniform resource locators (URLs), each comprising one or more fragments, and a plurality of titles, each comprising one or more words. A unique index for one occurrence of each of at least a subset of the one or more fragments and the one or more words is generated with the menu management computing apparatus. At least one dictionary comprising the generated indices associated with a corresponding one of the subset of the one or more fragments or the one or more words is generated with the menu management computing apparatus. A modified menu is generated by the menu management computing apparatus by replacing each occurrence of each of the at least a subset of the one or more fragments and the one or more words of the original menu with a corresponding one of the unique indices. The modified menu and the at least one dictionary are sent with the menu management computing apparatus to the client computing device.

A non-transitory computer readable medium having stored thereon instructions for compressing menus includes machine executable code which when executed by a processor, causes the processor to perform steps including obtaining an original menu associated with a web page requested by a client computing device. The original menu comprises at least a plurality of URLs, each comprising one or more fragments, and a plurality of titles, each comprising one or more words. A unique index for one occurrence of each of at least a subset of the one or more fragments and the one or more words is generated. At least one dictionary comprising the generated indices associated with a corresponding one of the subset of the one or more fragments or the one or more words is generated. A modified menu is generated by replacing each occurrence of each of the at least a subset of the one or more fragments and the one or more words of the original menu with a corresponding one of the unique indices. The modified menu and the at least one dictionary are sent to the client computing device.

A menu management computing apparatus includes a memory and a processor coupled to the memory. The processor is configured to execute programmed instructions stored in the memory including obtaining an original menu associated with a web page requested by a client computing device. The original menu comprises at least a plurality of URLs, each comprising one or more fragments, and a plurality of titles, each comprising one or more words. A unique index for one occurrence of each of at least a subset of the one or more fragments and the one or more words is generated. At least one dictionary comprising the generated indices associated with a corresponding one of the subset of the one or more fragments or the one or more words is generated. A modified menu is generated by replacing each occurrence of each of the at least a subset of the one or more fragments and the one or more words of the original menu with a corresponding one of the unique indices. The modified menu and the at least one dictionary are sent to the client computing device.

This technology provides a number of advantages including methods, non-transitory computer readable medium, and apparatuses that reduce the amount of resources required to send and store web page menus. With this technology, a web page menu is parsed at a menu management computing apparatus and modified to replace URL fragments and words in category and subcategory titles with unique indices. A dictionary is generated to store each of the fragments and words and corresponding indices. The modified original menu and the dictionary, which together require less time to send and less memory to store than the original menu, are then sent to a client computing device that requested the web page having the associated original menu.

BRIEF DESCRIPTION OF THE DRAWINGS

FIG. 3 is an exemplary original web page menu; and

FIG. 4 is the exemplary original web page menu of FIG. 3 modified according to the exemplary method of FIG. 2.

DETAILED DESCRIPTION

Figure 1:
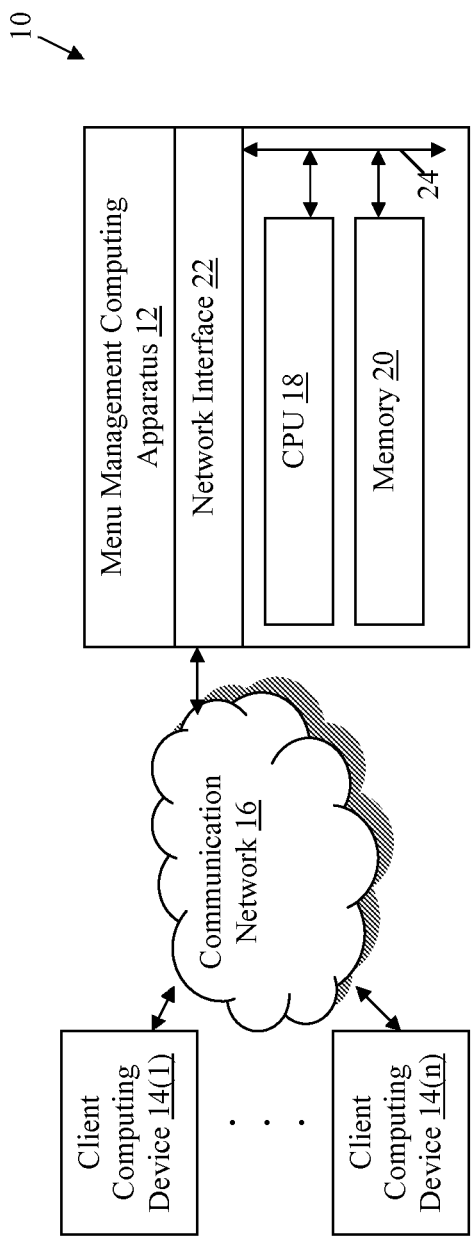
FIG. 1 is a block diagram of a network environment which incorporates an exemplary menu management computing apparatus.

An exemplary network environment 10 is illustrated in FIG. 1 as including an exemplary menu management computing apparatus 12. In this example, the menu management computing apparatus 12 is coupled to a plurality of client computing devices 14(1)-14(n) by communication network 16, although other types and numbers of devices, components, and elements in other topologies could be used. This technology provides a number of advantages including methods, non-transitory computer readable medium, and apparatuses that compress web page menus and reduce the amount of resources required to send and store web page menus.

Referring more specifically to FIG. 1, the menu management computing apparatus 12 includes at least one processor or central processing unit (CPU) 18, a memory 20, and a network interface 22, which are coupled together by a bus 24 or other link, although other numbers and types of components, parts, devices, systems, and elements in other configurations and locations can also be used. Generally, the menu management computing apparatus 12 processes requests for web pages and other web content received from the client computing devices 14(1)-14(n) via the communication network 16 according to the HTTP-based protocol, for example, although the menu management computing apparatus 12 can also provide other numbers and types of functions. The processor 18 in the menu management computing apparatus 12 may execute a program of stored instructions one or more aspects of the present invention, as described and illustrated by way of the embodiments herein, although the processor 18 could execute other numbers and types of programmed instructions.

The memory 20 in the menu management computing apparatus 12 stores these programmed instructions for one or more aspects of the present invention as described and illustrated herein, although some or all of the programmed instructions could be stored and/or executed elsewhere. A variety of different types of memory storage devices, such as a RAM or a ROM in the system or a floppy disk, hard disk, CD ROM, DVD ROM, or other non-transitory computer readable medium which is read from and/or written to by a magnetic, optical, or other reading and/or writing system that is coupled to the processor 18, can be used for the memory 20 in the menu management computing apparatus 12.

The network interface 22 in the menu management computing apparatus 12 is used to operatively couple and communicate between the menu management computing apparatus 12 and the client devices 14(1)-14(n) via the communication network 16, although other types and numbers of networks with other types and numbers of connections and configurations can also be used. The menu management computing apparatus 12 may be a server computing device, such as any version of Microsoft® IIS server or Apache® server, although other types of servers may be used, or a web content proxy server, for example.

The communication network 16 can include one or more networks, such as one or more local area networks (LANs) and/or wide area networks (WANs) such as the Internet. By way of example only, the communication network 16 can use TCP/IP over Ethernet and industry-standard protocols, including Hypertext transfer protocol (HTTP), secure HTTP (HTTPS), wireless application protocol (WAP), and/or SOAP, although other types and numbers of communication networks having their own communications protocols, can also be used.

The client computing devices 14(1)-14(n) enable a user to request, receive, and interact with applications, web services, and content hosted by the menu management computing apparatus 12 via the communication network 16, although one or more of the client computing devices 14(1)-14(n) could access content and utilize other types and numbers of applications from other sources and could provide a wide variety of other functions for the user. By way of example only, the client computing devices 14(1)-14(n) can be mobile computing devices, smart phones, personal digital assistants, or computers.

In this example, each of the client computing devices 14(1)-14(n) includes at least one processor or a CPU, a memory, a network interface, a user input device, and a display, which are coupled together by a bus or other link, although one or more of client computing devices 14(1)-14(n) can include other numbers and types of components, parts, devices, systems, and elements in other configurations. The processor in each of the client computing devices 14(1)-14(n) can execute a program of instructions stored in the memory of each of the client computing devices 14(1)-14(n) for one or more aspects of the present invention as described and illustrated herein, although the processor could execute other numbers and types of programmed instructions.

The memory in each of the client computing devices 14(1)-14(n) stores these programmed instructions for one or more aspects of the present invention, as described and illustrated herein, although some or all of the programmed instructions could be stored and/or executed elsewhere. A variety of different types of memory storage devices, such as a RAM or a ROM in the system or a floppy disk, hard disk, CD ROM, or other non-transitory computer readable medium which is read from and/or written to by a magnetic, optical, or other reading and/or writing system that is coupled to processor can be used for the memory in each of the client computing devices 14(1)-14(n). Each of the client computing devices 14(1)-14(n) can be configured to access web services and content through a web browser stored in the memory.

The network interface in each of the client computing devices 14(1)-14(n) is used to operatively couple and communicate between each of the client computing devices 14(1)-14(n) and the menu management computing apparatus 12 via the communication network 16, although other types and numbers of communication networks with other types and numbers of connections and configurations can be used.

The user input device in each of the client computing devices 14(1)-14(n) can be used to input selections, such as a request for a particular web page, although the user input device could be used to input other types of requests and data and interact with other elements. The user input device in each of the client computing devices 14(1)-14(n) can include a keypad, touch screen, and/or vocal input processing system, although other types and numbers of user input devices can also be used.

The display in each of the client computing devices 14(1)-14(n) can be used to show data and information to the user, such as a requested web page by way of example only. The display in each of the client computing devices 14(1)-14(n) can be an LCD, LED, or OLED display, for example, although other types and numbers of displays could be used depending on the particular type of client computing device 14(1)-14(n).

Although embodiments of the menu management computing apparatus 12 and client computing devices 14(1)-14(n) are described and illustrated herein, each of the menu management computing apparatus 12, and client computing devices 14(1)-14(n) can be implemented on any suitable computer apparatus or computing device. It is to be understood that the apparatuses and devices of the embodiments described herein are for exemplary purposes, as many variations of the specific hardware and software used to implement the embodiments are possible, as will be appreciated by those skilled in the relevant art(s). Furthermore, each of the devices of the embodiments may be conveniently implemented using one or more general purpose computers, microprocessors, digital signal processors, and micro-controllers, programmed according to the teachings of the embodiments, as described and illustrated herein, and as will be appreciated by those ordinary skill in the art.

In addition, two or more computing apparatuses or devices can be substituted for any one of the devices in any embodiment described herein. Accordingly, principles and advantages of distributed processing, such as redundancy and replication also can be implemented, as desired, to increase the robustness and performance of the devices of the embodiments. The embodiments may also be implemented on computer apparatuses or devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 2:
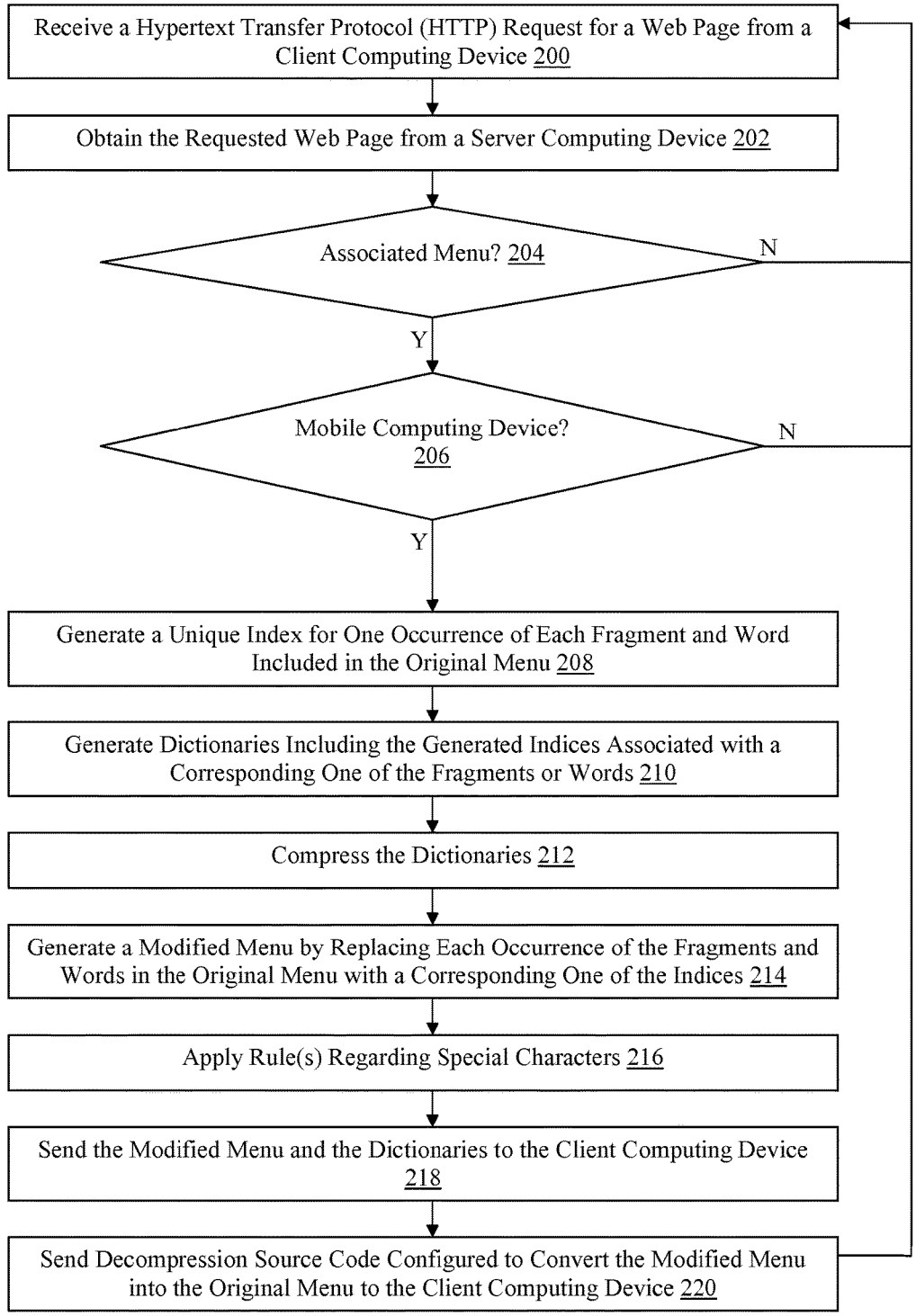
FIG. 2 is a flowchart of an exemplary method for compressing a web page menu.

An exemplary method for compressing an original menu will now be described with reference to FIGS. 1-4. Referring more specifically to FIG. 2, in step 200 the menu management computing apparatus 12 receives a request for a web page, such as a hypertext transfer protocol (HTTP) request, from one of the client computing devices 14(1)-14(n). In step 202, the menu management computing apparatus 12 obtains the requested web page from one of the menu management computing apparatus 12.

In step 204, the menu management computing apparatus 12 determines whether the web page has an associated original menu. The associated original menu can be any menu, although hierarchical menus with categories and subcategories may have repeated content allowing for relatively significant compression, as described and illustrated in more detail later. In some examples, the original menu is included in the source code for the web page and, in other examples, the web page source code references a separate external file, such as a JavaScript file, which includes the original menu.

In examples in which the original menu is defined in a separate file, the initially-requested web page source code may cause a web browser of the requesting one of the client computing device 14(1)-14(n) to submit a request for the file. The menu management computing apparatus 12 can parse the web page or file obtained from the one of the menu management computing apparatus 12 to identify any key words or patterns representing a menu (e.g. alternating plan text titles and URL hyperlinks), for example, although other methods of identifying an original menu associated with the requested web page can also be used.

If the menu management computing apparatus 12 determines in step 204 that the requested web page does not have an associated original menu, then the No branch is taken to step 200 and another request is received from one of the client computing devices 14(1)-14(n). If the menu management computing apparatus 12 determines in step 204 that the requested web page does have an associated original menu, then the Yes branch is taken to step 206.

Optionally, in step 206, the menu management computing apparatus 12 determines whether the requesting one of the client computing devices 14(1)-14(n) is a device having relatively limited storage capabilities, referred to herein as a mobile computing device. The menu management computing apparatus 12 can determine whether the requesting one of the client computing devices 14(1)-14(n) is a mobile computing device based on a user agent header included in one or more of the packets associated with the HTTP request received in step 200, for example, although other methods of identifying mobile computing devices can also be used.

If the menu management computing apparatus 12 determines that the requesting one of the client computing devices 14(1)-14(n) is not a mobile computing device, then the No branch is taken to step 200 and another request is received from one of the client computing devices 14(1)-14(n). Accordingly, in some examples, steps 208-220 are only performed for mobile computing devices which have relatively limited storage capabilities and can therefore benefit most from the compression method described and illustrated herein.

If the menu management computing apparatus 12 determines in step 206 that the requesting one of the client computing devices 14(1)-14(n) is a mobile computing device, then the Yes branch is taken to step 208. In step 208, the menu management computing apparatus 12 parses the original menu and generates a unique index for at least a subset of the fragments and/or words of the original menu. The original menu can include a plurality of titles, each including one or more words, and a plurality of URLs, each including one or more fragments. Exemplary URL fragments include an entire URL, a prefix, a path, one or more words of a path, a query, a key/value pair of a query, a key of a query, a value of a query, or combinations thereof, for example, although other URL fragments can also be used.

Referring to FIG. 3, an exemplary original menu 300 associated with a web page is illustrated. In this example, the original menu 300 defines a hierarchical menu with categories having titles of "Shoes," "Accessories," and "Dresses." The "Shoes" and "Dresses" categories each have two subcategories with titles of "Men Shoes" and "Women Shoes" and "Long Dresses" and "Ceremonies," respectively. In this example, each of the "Accessories" category and the four subcategories has an associated URL of a web page having content associated with the respective category or subcategory title.

Referring back to FIG. 2, in step 208, only one index is generated for multiple occurrences of the same fragment and/or word in the original menu 300. In this example, only one index is generated for the title word "Shoes" in the source code 300 even though the word appears in more than one title. Additionally, only one index is generated for the key/value pair fragment "sort=price" even though the fragment appears in all of the URLs. The menu management computing apparatus 12 can be configured to parse the original menu 300 to identify title words and URL fragments based on an established configuration in order to generate the indices.

The menu management computing apparatus 12 parses some or all of the titles of the original menu 300 and generates an index for some or all words or combination of words in each of the titles. Words can be any sequence of characters and numbers separated by a space (e.g. "Men" and "Shoes"). In one exemplary configuration, the menu management computing apparatus 12 generates an index for every encountered word in a title. Words included in titles may be repeated as the title in a lower category in a hierarchical menu is likely to share word(s) with the title in a higher category, while adding word(s) to be more specific.

The menu management computing apparatus 12 also parses some or all of the URLs of the original menu 300 and generates an index for some or all fragments or combination of fragments in each of the URLs. In one exemplary configuration, the menu management computing apparatus 12 only generates an index upon encountering a URL fragment more than once or a predetermined number of times, although indices can also be generated by the menu management computing apparatus 12 upon initially encountering a fragment.

In the exemplary original menu 300 illustrated in FIG. 3, in this example, the menu management computing apparatus 12 will only generate a unique index for the multiple occurrences of the "sort=price" key/value pair fragment upon encountering it a second time in the URL associated with the "Women Shoes" subcategory. The menu management computing apparatus 12 can parse the original menu 300 and maintain a list of previously encountered fragments and/or words which is used to determine whether an associated index should be, or has previously been, generated.

In another example, the menu management computing apparatus 12 can be configured to parse each URL to identify the prefix (e.g. "http://www.acme.com/catalog"), path (e.g. "Men_Shoes/products"), and/or query fragments (e.g. "plp_i=2354&sort=price") that are likely to be repeated in other URLs of the source code 300. Although one example is illustrated and described here, other methods and configurations can be used to parse the URLs and titles of the original menu 300.

Optionally, the generated indices include one or more digits in base 62 format with each digit being an ASCII lower case letter, upper case letter, or number from 0-9. In one example, the menu management computing apparatus 12 uses two base 62 digits which allows the menu management computing apparatus 12 to represent 62o or 3844 numbers, although other numbers of digits and bases can also be used.

In step 210, the menu management computing apparatus 12 generates at least one dictionary including the generated indices associated with a corresponding one of the fragments or words or combinations of fragments or words. In this example, the menu management computing apparatus 12 generates a words dictionary for storing the generated unique indices for occurrences of a word, URL, path, or word of a path, and a parameters dictionary for storing the generated unique indices for occurrences of a query, key/value pair of a query, key of a query, or value of a query for example. Other numbers of dictionaries storing other fragments and/or words can also be used.

An exemplary words dictionary generated in step 210 for the source code 300 is illustrated in Table 1.

TABLE 1

| Index | Fragment/Word |
|-------|---------------|
| 00    | products      |
| 01    | 02/00         |
| 02    | Accessories   |
| 03    | Shoes         |
| 04    | Men           |
| 05    | Women         |
| 06    | price         |
| 07    | Dresses       |
| 08    | Long          |
| 09    | Ceremonies    |

An exemplary parameters dictionary for the source code 300 is illustrated in Table 2.

TABLE 2

| Index | Fragment/Word |
|-------|---------------|
| 00    | sort = price  |
| 01    | plp_i         |
| 02    | sort          |

Optionally, in step 212, the menu management computing apparatus 12 compresses at least a portion of one or more of the dictionaries. Also optionally, the menu management computing apparatus 12 can determine whether the requesting one of the client computing devices 14(1)-14(n) is a mobile computing device, as described and illustrated earlier in step 206, and only compress at least a portion of one or more of the dictionaries when it is determined that the requesting one of the client computing devices 14(1)-14(n) is a mobile computing device. Accordingly, in some examples, step 212 is only performed for mobile computing devices which have relatively limited storage capabilities and can therefore benefit most from a second level of compression as described and illustrated herein.

In the exemplary original menu 300 illustrated in FIG. 3, in one example, the words dictionary includes an entry of "01:Accessories/Products" which establishes an association of the base 62 number "01" with the "Accessories/Products" path fragment. In this example, the menu management computing apparatus 12 can compress the dictionary by replacing "Accessories/Products" in the dictionary entry associated with the "01" index with indices generated in step 208 for portions of the fragment (e.g. "Accessories" and "Products"). In this example, "Accessories" is associated with the 02 index and "Products" is associated with the 00 index in the dictionary. Accordingly, the menu management computing apparatus 12 can replace the "01:Accessories/Products" entry using the indices generated in step 208 (e.g. "01:02/00").

Alternatively, in examples in which indices were not generated for portions of a fragment in step 208, the menu management computing apparatus 12 can generate indices in step 212, store the generated indices and associations in the dictionary, and replace the fragment as described and illustrated earlier. In some examples, the menu management computing apparatus 12 can compress the dictionary for fragments and/or words having a threshold number of characters or a threshold number of portions shared with other fragments and/or words in the dictionary. By establishing a threshold, the increased time required to compress the dictionary can be balanced with the reduced size of the compressed dictionary. Other methods of compressing the dictionary can also be used.

In step 214, the menu management computing apparatus 12 generates a modified menu by replacing occurrence(s) of the fragments and/or words in the original menu 300 with a corresponding one of the indices generated in step 208. In one example, the modifications to the original menu 300 occur during an initial parsing of the original menu 300 and while the dictionary is being generated by the menu management computing apparatus 12. In another example, the menu management computing apparatus 12 parses the original menu 300 a second time, subsequent to generating the dictionary, and uses the dictionary to determine which fragments and/or words are to be replaced.

Optionally, the fragments and/or words in the original menu 300 are replaced by the longest (e.g. largest number of successive characters) corresponding fragment and/or word in the dictionary. For example, the path fragment (e.g. "Men_Shoes/products") of a URL associated with a subcategory is repeated several times in the original menu 300. Based on the configuration of the menu management computing apparatus 12, the path fragment may be included in the dictionary associated with an index. In this example, occurrences of the path of the URL are replaced by the corresponding index even when indices were generated, in step 208, and associated in the dictionary, in step 210, with one or more words of the path (e.g. "Men," "Shoes," or "products"). In this example, the dictionary entry for the path fragment can optionally be compressed using the entries of the words of the path, as described and illustrated earlier with reference to step 212, and path fragment in the original menu 300 will be replaced with a reduced number of indices.

Referring to FIG. 4, an exemplary modified menu 400 generated in step 214 is illustrated. In this example, the modified menu 400 includes "0403" in place of the "Men Shoes" subcategory title included in the original menu 300. As indicated in the exemplary words dictionary shown in Table 1, the base 62 index "04" was generated by the menu management computing apparatus 12, in step 208, and associated with the word "Men" in the dictionary, in step 210. Similarly, the base 62 index "03" was generated by the menu management computing apparatus 12, in step 208, and associated with the word "Shoes" in the dictionary, in step 210. Other indices and dictionary entries can also be used.

The source code 400 further includes "0403/00?01&2354&00" in place of the "http://www.acme.com/catalog/Men_Shoes/products?plp_i=2354&sort=price" URL associated with the "Men Shoes" subcategory. The "Men_Shoes" portion of the path in the URL associated with the "Men Shoes" subcategory is replaced with "0403" which are the indices associated with the "Men" and "Shoes" words, respectively, in the words dictionary. Additionally, the "products" portion of the path and "plp_i" key fragment in the URL associated with the "Men Shoes" subcategory are replaced with "00" and "01," respectively, which are the indices associated with the "products" portion of the path and the "plp_i" key fragment in the words and parameters dictionaries, respectively. Finally, the "sort=price" key/value pair fragment in the URL associated with the "Men Shoes" subcategory is replaced with "00," which is the index associated with the "sort=price" key/value pair fragment in the parameters dictionary. The other titles and URLs in the source code 300 are similarly modified as illustrated in the modified menu 400.

In step 216, the menu management computing apparatus 12 optionally applies one or more rules to remove and/or insert spaces and/or special characters in the modified menu 400, for example, so that the titles and URLs can be properly interpreted and decompressed at the requesting one of the client computing device 14(1)-14(n). In one example in which all words in titles are replaced by a corresponding two digit base 62 index generated in step 208, the spaces or other standard separator in the titles can be removed. In this example, every two digits in a title represents a word of the title so the separators do not need to be included and can be removed to reduce the size of the modified menu 300. In the modified menu 400, the space between indices that replaced the words in the "Men Shoes," "Women Shoes," and "Long Dresses" titles is removed.

In examples in which some fragments of a URL (e.g. words of a path) are not be replaced by an index, the menu management computing apparatus 12 can insert a space before and/or after any set of two or more sequential indices in the URL. By inserting a space, which is not a valid character inside a URL, any valid characters and/or fragments not replaced can be differentiated from any indices that replaced fragments included in the original menu 300. Other invalid characters can also be used to differentiate indices that replaced fragments in the original menu 300.

Additionally, in examples in which all key/value pair fragments are converted, a "&" or other special character separating sequential key/value pairs can be removed by the menu management computing apparatus 12. Instead, in these examples, the "&" character can be inserted by the menu management computing apparatus 12 before and/or after any value fragment of a query fragment for any of the URLs. By inserting the "&" character(s), the value can be differentiated from any indices that replaced fragments included in the original menu 300.

In the modified menu 400, the value fragment "2354" of the URL associated with the "Men Shoes" subcategory is preceded and followed by a "&" character, which differentiates the "2354" value fragment from the "01" and "00" indices that precede and follow, respectively, the "2354" value fragment. Other special characters can also be used to differentiate indices that replaced fragments in the original menu 300.

Because all of the URLs have the same prefix fragment of "http://www.acme.com/catalog" in the original menu 300, the prefix fragment is removed and replaced by a space in the modified menu 400. The prefix fragment could also be replaced by an index value or a special character, for example. Additionally, the "_" special character can be removed from any of the URLs since two indices (e.g. "0403") representing two words of a path fragment are always separated by the "_" character as a space is an invalid character in a URL and the words would be represented by only one index if there were no "_" character between them.

Other characters (e.g. "/" and "?") are not removed from the URLs in this example since they are valid characters and are not digits in the base 62 format used for the indices. Other rules for modifying titles and/or URL fragments with respect to spaces and special characters can also be used.

Referring back to FIG. 2, in step 218, the menu management computing apparatus 12 sends the modified menu 400 and the dictionary to the requesting one of the client computing devices 14(1)-14(n). In step 220, the menu management computing apparatus 12 sends decompression source code to the requesting one of the client computing devices 14(1)-14(n). The decompression source code, when executed by the requesting one of the client computing devices 14(1)-14(n), converts the modified menu 400 into the original menu 300 using the dictionaries generated in step 210, and sent to the requesting one of the client computing devices 14(1)-14(n) in step 218, and based on the rules applied in step 216.

Accordingly, the decompression source code, sent by the menu management computing apparatus 12 with the dictionaries and the modified menu 400, is configured to parse the modified menu 400, replace encountered indices with corresponding URL fragments and/or title words in the dictionaries, and reverse the results of the rules applied in step 216. For example, the decompression source code can be configured to inset a space following each word in a title that is converted. In another example, a "_" special character in a path fragment of a URL is inserted by the menu management computing apparatus 12 following any each word of the path that is converted.

The decompression source code can be configured to reverse the result of applying one or more other rules and/or perform other functions in order to convert the modified menu 400 into the original menu 300. Additionally, the decompression source code can be stored in the memory 20 of the menu management computing apparatus 12 and sent to a requesting one of the client computing devices 14(1)-14(n) following, or along with, the modified menu 400 and the dictionaries.

Accordingly, as illustrated and described herein this technology provides a number of advantages including methods, non-transitory computer readable medium, and apparatuses that reduce the storage requirements for, and time required to retrieve, web page menus. With this technology, a web page menu is compressed using at least one dictionary to store indices corresponding to word(s) in menu titles and/or fragment(s) in URLs of the menu. The compressed menu is sent to a requesting client computing device along with the dictionaries and decompression source code configured to convert the modified menu into the original menu. Advantageously, the modified menu, dictionaries, and decompression source code can be sent in less time and are smaller in size than the original menu.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for compressing menus, the method comprising:
   obtaining, by a menu management computing apparatus, a web page requested by a client computing device;
   determining, by the menu management computing apparatus, when the obtained web page includes an original hierarchical menu, wherein the original hierarchical menu comprises at least a plurality of uniform resource locators (URLs) each comprising one or more fragments, one or more categories and one or more sub-categories, wherein each of the one or more categories and the one or more sub-categories includes a plurality of titles comprising one or more words;
   when the determination indicates that the requested web page includes the original hierarchical menu executing:
   generating, by the menu management computing apparatus, a unique index for one occurrence of each of at least a subset of the one or more fragments of the plurality of URLs and the one or more words of the plurality of titles in each of the one or more categories and the one or more sub-categories of the original hierarchical menu, wherein each of the subset of the one or more fragments comprises a portion of one of the plurality of URLs that is less than an entirety of the one of plurality of URLs;
   generating, by the menu management computing apparatus, a modified hierarchical menu by replacing each occurrence of each of the at least a subset of the one or more fragments and the one or more words of the original hierarchical menu with a corresponding one of the unique indices;
   generating, by the menu management computing apparatus, at least one dictionary comprising the generated indices associated with a corresponding one of the subset of the one or more fragments or the one or more words; and
   sending, by the menu management computing apparatus, the modified hierarchical menu and the at least one dictionary to the client computing device.

2. The method of claim 1, wherein the one or more fragments comprise one or more of a prefix, path, word of a path, query, key/value pair of a query, key of a query, or value of a query.

3. The method of claim 1, wherein the at least one dictionary comprises a words dictionary for storing the generated unique indices for occurrences of a word, URL, prefix, path, or word of a path and a parameters dictionary for storing the generated unique indices for occurrences of a query, key/value pair of a query, key of a query, or value of a query.

4. The method of claim 1, further comprising:
   compressing, by the menu management computing apparatus, at least a part of the at least one dictionary when one of the subset of the one or more fragments or the one or more words exceeds a threshold number of portions or characters that are shared in other ones of the subset of the one or more fragments or the one or more words; and
   sending, by the menu management computing apparatus, to the client computing device, source code configured to convert the modified hierarchical menu into the original hierarchical menu using the at least one dictionary.

5. The method of claim 1, wherein the subset of the one or more fragments includes only one or more of the fragments occurring more than once in the plurality of URLs.

6. The method of claim 1, wherein the unique indices comprise one or more digits in base 62 format.

7. The method of claim 1, wherein the generating the modified hierarchical menu further comprises:
   removing any separator between words for any of the plurality of titles comprising two or more words;
   inserting a space before or after any two or more sequential indices for any of the URLs; and
   inserting a special character before or after any value of a query for any of the URLs.

8. The method of claim 1, further comprising:
   identifying, by the menu management computing apparatus, when the client computing device is a mobile computing device, upon the determination indicating that the requested web page includes the original hierarchical menu; and when the identifying indicates that the client computing device is a mobile computing device only performing the generating the unique index, dictionary, and modified hierarchical menu and sending the modified hierarchical menu when the determining indicates that the client computing device is a mobile computing device.

9. A non-transitory computer readable medium having stored thereon instructions for compressing menus comprising machine executable code which when executed by at least one processor, causes the processor to perform steps comprising:

obtaining a web page requested by a client computing device;

determining when the obtained web page includes an original hierarchical menu, wherein the original hierarchical menu comprises at least a plurality of uniform resource locators (URLs) each comprising one or more fragments, one or more categories and one or more sub-categories, wherein each of the one or more categories and the one or more sub-categories includes a plurality of titles comprising one or more words;

when the determination indicates that the requested web page includes the original hierarchical menu executing programmed instructions to:

generating a unique index for one occurrence of each of at least a subset of the one or more fragments of the plurality of URLs and the one or more words of the plurality of titles in each of the one or more categories and the one or more sub-categories of the original hierarchical menu, wherein each of the subset of the one or more fragments comprises a portion of one of the plurality of URLs that is less than an entirety of the one of plurality of URLs;

generating a modified hierarchical menu by replacing each occurrence of each of the at least a subset of the one or more fragments and the one or more words of the original hierarchical menu with a corresponding one of the unique indices;

generating at least one dictionary comprising the generated indices associated with a corresponding one of the subset of the one or more fragments or the one or more words; and sending the modified hierarchical menu and the at least one dictionary to the client computing device.

10. The medium of claim 9, wherein the one or more fragments comprise one or more of a prefix, path, word of a path, query, key/value pair of a query, key of a query, or value of a query.

11. The medium of claim 9, wherein the at least one dictionary comprises a words dictionary for storing the generated unique indices for occurrences of a word, URL, prefix, path, or word of a path and a parameters dictionary for storing the generated unique indices for occurrences of a query, key/value pair of a query, key of a query, or value of a query.

12. The medium of claim 9, wherein the machine executable code, when executed by the processor, further causes the processor to perform one or more additional steps comprising:

compressing at least a part of the at least one dictionary when one of the subset of the one or more fragments or the one or more words exceeds a threshold number of portions or characters that are shared in other ones of the subset of the one or more fragments or the one or more words; and sending to the client computing device source code configured to convert the modified hierarchical menu into the original hierarchical menu using the at least one dictionary.

13. The medium of claim 9, wherein the subset of the one or more fragments includes only one or more of the fragments occurring more than once in the plurality of URLs.

14. The medium of claim 9, wherein the unique indices comprise one or more digits in base 62 format.

15. The medium of claim 9, wherein the generating the modified hierarchical menu further comprises:

removing any separator between words for any of the plurality of titles comprising two or more words;

inserting a space before or after any two or more sequential indices for any of the URLs; and inserting a special character before or after any value of a query for any of the URLs.

16. The medium of claim 9, wherein the machine executable code, when executed by the processor, further causes the processor to perform one or more additional steps comprising:

identifying when the client computing device is a mobile computing device, upon the determination indicating that the requested web page includes the original hierarchical menu; and when the identifying indicates that the client computing device is a mobile computing device only performing the generating the unique index, dictionary, and modified hierarchical menu and sending the modified hierarchical menu when the determining indicates that the client computing device is a mobile computing device.

17. A menu management computing apparatus, comprising:

a memory; and a processor coupled to the memory and configured to execute programmed instructions comprising and stored in the memory to:

obtain a web page requested by a client computing device;

determine when the obtained web page includes an original hierarchical menu, wherein the original hierarchical menu comprises at least a plurality of uniform resource locators (URLs) each comprising one or more fragments, one or more categories and one or more sub-categories, wherein each of the one or more categories and the one or more sub-categories includes a plurality of titles comprising one or more words;

when the determination indicates that the requested web page includes the original hierarchical menu execute programmed instructions to:

generate a unique index for one occurrence of each of at least a subset of the one or more fragments of the plurality of URLs and the one or more words of the plurality of titles in each of the one or more categories and the one or more sub-categories of the original hierarchical menu, wherein each of the subset of the one or more fragments comprises a portion of one of the plurality of URLs that is less than an entirety of the one of plurality of URLs;

generate a modified hierarchical menu by replacing each occurrence of each of the at least a subset of the one or more fragments and the one or more words of the original hierarchical menu with a corresponding one of the unique indices;

generate at least one dictionary comprising the generated indices associated with a corresponding one of the subset of the one or more fragments or the one or more words; and send the modified hierarchical menu and the at least one dictionary to the client computing device.

18. The apparatus of claim 17, wherein the one or more fragments comprise one or more of a prefix, path, word of a path, query, key/value pair of a query, key of a query, or value of a query.

19. The apparatus of claim 17 wherein the at least one dictionary comprises a words dictionary for storing the generated unique indices for occurrences of a word, URL, prefix, path, or word of a path and a parameters dictionary for storing the generated unique indices for occurrences of a query, key/value pair of a query, key of a query, or value of a query.

20. The apparatus of claim 17, wherein the processor is further configured to execute one or more additional programmed instructions comprising and stored in the memory to:

compress at least a part of the at least one dictionary when one of the subset of the one or more fragments or the one or more words exceeds a threshold number of portions or characters that are shared in other ones of the subset of the one or more fragments or the one or more words; and send to the client computing device source code configured to convert the modified hierarchical menu into the original menu using the at least one dictionary.

21. The apparatus of claim 17, wherein the subset of the one or more fragments includes only one or more of the fragments occurring more than once in the plurality of URLs.

22. The apparatus of claim 17 wherein the unique indices comprise one or more digits in base 62 format.

23. The apparatus of claim 17, wherein the processor is further configured to execute one or more additional programmed instructions comprising and stored in the memory to:

remove any separator between words for any of the plurality of titles comprising two or more words;

insert a space before or after any two or more sequential indices for any of the URLs; and insert a special character before or after any value of a query for any of the URLs.

24. The apparatus of claim 17, wherein the processor is further configured to execute one or more additional programmed instructions comprising and stored in the memory to:

identify when the client computing device is a mobile computing device, upon the determination indicating that the requested web page includes the original hierarchical menu; and when the identifying indicates that the client computing device is a mobile computing devices only performing the generating the unique index, dictionary, and modified hierarchical menu and sending the modified hierarchical menu when the determining indicates that the client computing device is a mobile computing device.

* * * * *